(12) United States Patent
McGilvray, Jr. et al.

(10) Patent No.: US 11,137,093 B2
(45) Date of Patent: Oct. 5, 2021

(54) ANNULAR SLEEVES FOR FLUID-HANDLING COMPONENTS

(71) Applicant: Cameron International Corporation, Houston, TX (US)

(72) Inventors: Mark Anthony McGilvray, Jr., Katy, TX (US); Kevin Peter Minnock, Houston, TX (US); Amanda Diane Smith, Houston, TX (US); James Daniel Ekdahl, Katy, TX (US); Loc G. Hoang, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 334 days.

(21) Appl. No.: 15/849,249

(22) Filed: Dec. 20, 2017

(65) Prior Publication Data
US 2019/0186662 A1    Jun. 20, 2019

(51) Int. Cl.
*F16L 19/02* (2006.01)
*F16L 23/16* (2006.01)
(Continued)

(52) U.S. Cl.
CPC ........ *F16L 19/0212* (2013.01); *E21B 33/037* (2013.01); *E21B 34/02* (2013.01); *F16K 51/00* (2013.01); *F16L 23/003* (2013.01); *F16L 23/036* (2013.01); *F16L 23/12* (2013.01); *F16L 23/16* (2013.01); *F16B 2200/506* (2018.08); *F16L 23/24* (2013.01)

(58) Field of Classification Search
CPC ..... F16L 19/0212; F16L 23/003; F16L 23/12; F16L 23/036; F16L 23/16; F16L 23/24; F16L 59/02; F16L 59/021; F16L 23/02; F16L 23/162; F16L 23/18; E21B 33/037; E21B 34/02; F16B 2200/506; F16K 51/00
USPC .... 285/368, 363, 47–48, 336; 277/614, 627; 251/366–368; 137/884
See application file for complete search history.

(56) References Cited

U.S. PATENT DOCUMENTS

| 860,035 A | * | 7/1907 | Kerr | ...................... F16J 15/184 |
| | | | | 384/149 |
| 1,491,032 A | * | 4/1924 | Croker | .................. F16L 25/026 |
| | | | | 285/50 |

(Continued)

FOREIGN PATENT DOCUMENTS

| EP | 2189697 A1 | 5/2010 |
| WO | 2013148025 A1 | 10/2013 |
| WO | 2014138071 A1 | 9/2014 |

OTHER PUBLICATIONS

Lamons SPC4 Load Indicating Fastener Technology, Lamons Sealing Global—Servicing Local, http://www.lamons.com/public/pdf/lit_reference/SPC4_Bolt_Brochure.pdf, accessed on Dec. 18, 2017, 3 pages.

(Continued)

*Primary Examiner* — John Bastianelli

(57) ABSTRACT

A system includes a first body of a fluid-handling component and a second body of a fluid-handling component. The system also includes a fastener configured to couple the first body to the second body, and an annular sleeve configured to surround a portion of the fastener that is positioned at an interface between the first body and the second body when the first body and the second body are coupled to one another.

18 Claims, 9 Drawing Sheets

(51) Int. Cl.
*F16L 23/00* (2006.01)
*F16L 23/12* (2006.01)
*E21B 33/037* (2006.01)
*F16L 23/036* (2006.01)
*E21B 34/02* (2006.01)
*F16K 51/00* (2006.01)
*F16L 23/24* (2006.01)

(56) References Cited

U.S. PATENT DOCUMENTS

| | | | | |
|---|---|---|---|---|
| 1,493,269 | A | * | 5/1924 | Kruesi .................... F16L 23/16 |
| | | | | 285/226 |
| 1,592,175 | A | * | 7/1926 | Boyd .................... F16L 25/026 |
| | | | | 285/48 |
| 1,905,684 | A | * | 4/1933 | Coffman ................. F16K 5/162 |
| | | | | 251/161 |
| 1,987,235 | A | * | 1/1935 | Janeway, Jr. ........... F16L 21/04 |
| | | | | 277/621 |
| 2,014,480 | A | * | 9/1935 | Martin, Jr. .............. F16K 5/222 |
| | | | | 251/184 |
| 2,598,224 | A | * | 5/1952 | Clonts ..................... F16K 41/02 |
| | | | | 251/278 |
| 2,752,579 | A | * | 6/1956 | Caldwell ............... F16L 25/023 |
| | | | | 439/191 |
| 3,409,268 | A | * | 11/1968 | Gachot .................. F16K 27/04 |
| | | | | 251/148 |
| 3,814,546 | A | * | 6/1974 | Ostwald ............. F04B 39/1053 |
| | | | | 417/298 |
| 4,184,785 | A | * | 1/1980 | Marjollet ................. F16J 13/06 |
| | | | | 403/337 |
| 4,428,603 | A | | 1/1984 | Davlin |
| 4,540,013 | A | | 9/1985 | Furley et al. |
| 4,570,659 | A | | 2/1986 | Karr, Jr. |
| 4,616,860 | A | * | 10/1986 | Faria .................... F16J 15/0881 |
| | | | | 277/614 |
| 4,685,193 | A | * | 8/1987 | Faria .................... F16J 15/0881 |
| | | | | 29/428 |
| 4,776,600 | A | * | 10/1988 | Kohn .................... F16L 25/026 |
| | | | | 277/611 |
| 4,795,171 | A | * | 1/1989 | Quevedo Del Rio ...................... |
| | | | | F04D 29/106 |
| | | | | 277/512 |
| 5,201,336 | A | | 4/1993 | Taylor et al. |
| 5,316,320 | A | * | 5/1994 | Breaker ................. F16L 23/16 |
| | | | | 277/611 |
| 6,484,749 | B1 | | 11/2002 | Lim et al. |
| 7,976,074 | B2 | * | 7/2011 | Anderson ............... F16L 23/18 |
| | | | | 285/368 |
| 2007/0006603 | A1 | * | 1/2007 | Reusche ............. H01R 13/7137 |
| | | | | 62/196.4 |
| 2013/0249171 | A1 | | 9/2013 | Kolb |
| 2013/0276722 | A1 | * | 10/2013 | Bronson ............ G05D 23/1852 |
| | | | | 122/19.2 |
| 2019/0351624 | A1 | * | 11/2019 | Huang ..................... B32B 27/08 |

OTHER PUBLICATIONS

Pikotek Testing and Research, Isolation Testing of Hardened Coated Steel (HCS) Washers, 2008, Lakewood, CO, 12 pages.

* cited by examiner

US 11,137,093 B2

1

ANNULAR SLEEVES FOR FLUID-HANDLING COMPONENTS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, such as mineral extraction systems, a variety of components are used to control a flow of fluid. For example, in mineral extraction systems, various valves and conduits may be used to regulate the flow of production fluids (e.g., oil, gas, or water) from a well. Such valves and conduits may be subjected to high temperatures from external sources during mineral extraction (i.e., drilling and production) operations. Unfortunately, these components may deform when subjected to high temperatures.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

2

Figure 10:
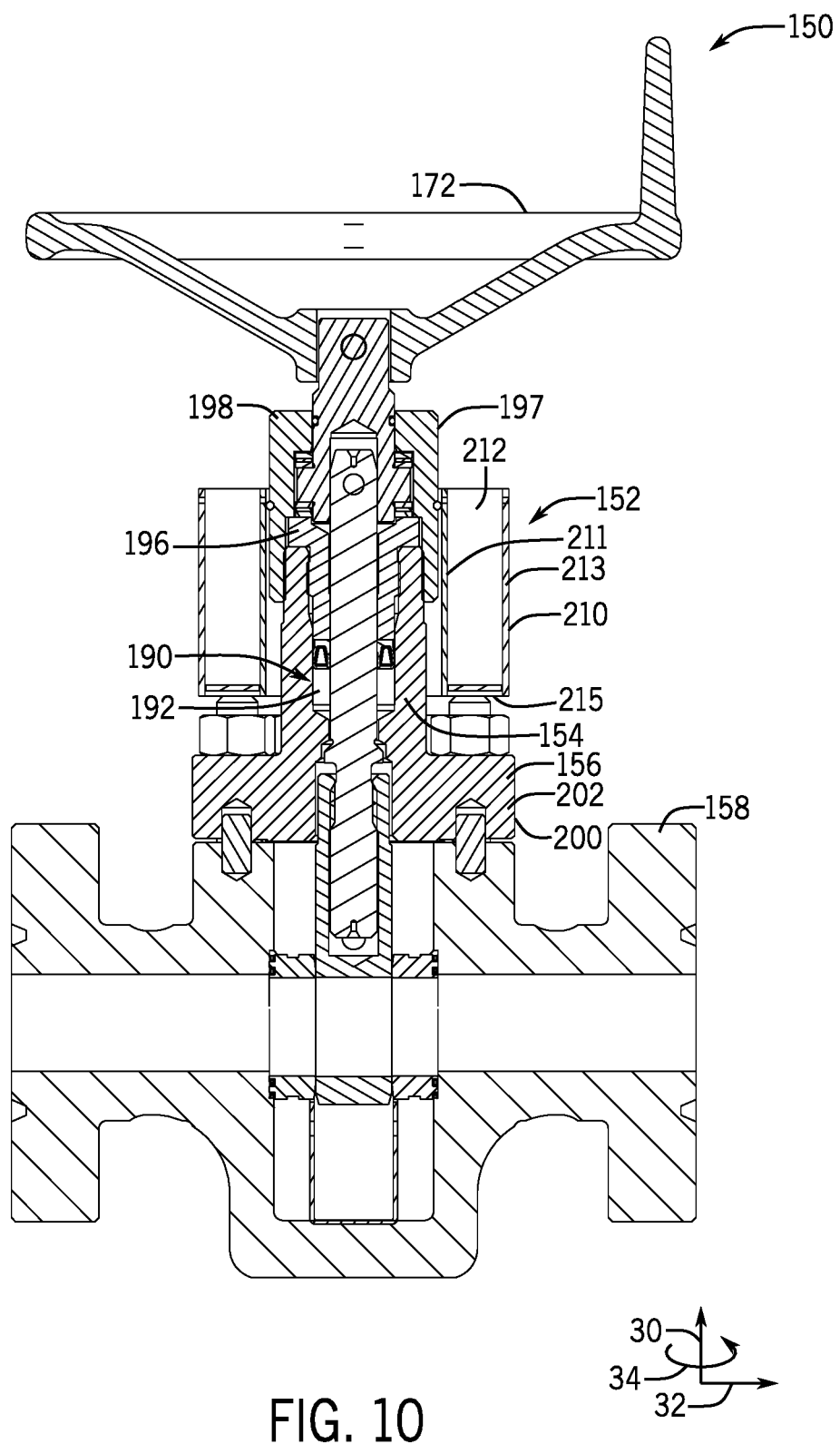
Figure 12:
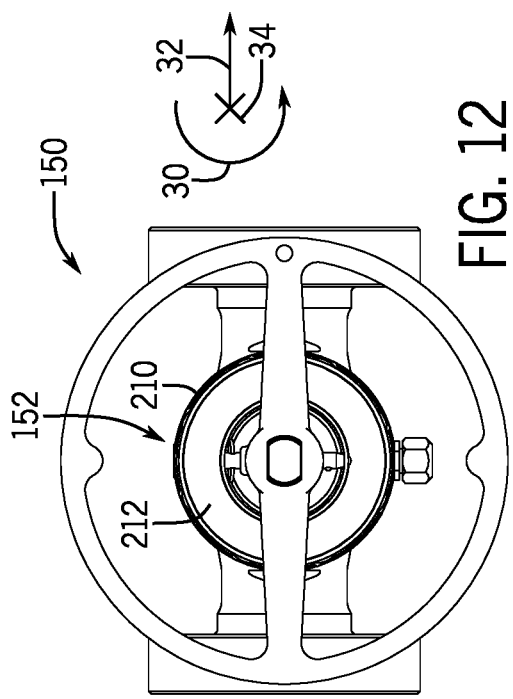
Figure 13:
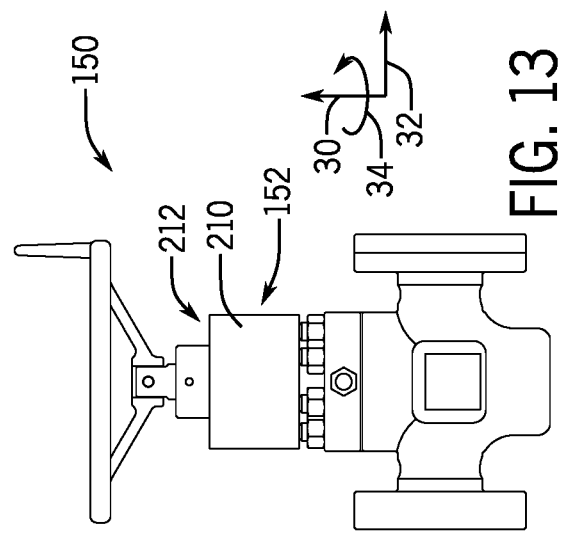
Figure 11:
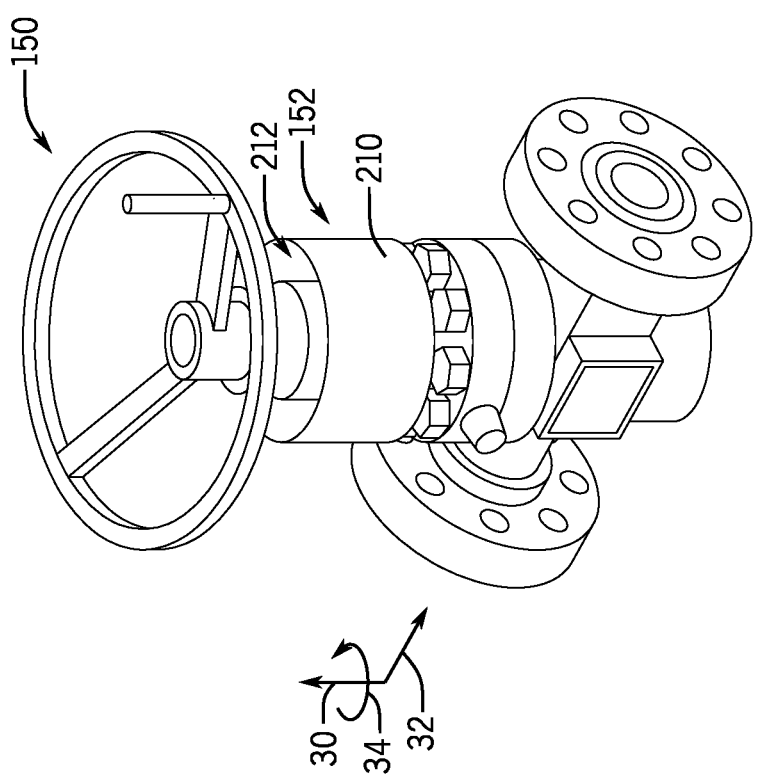
Figure 14:
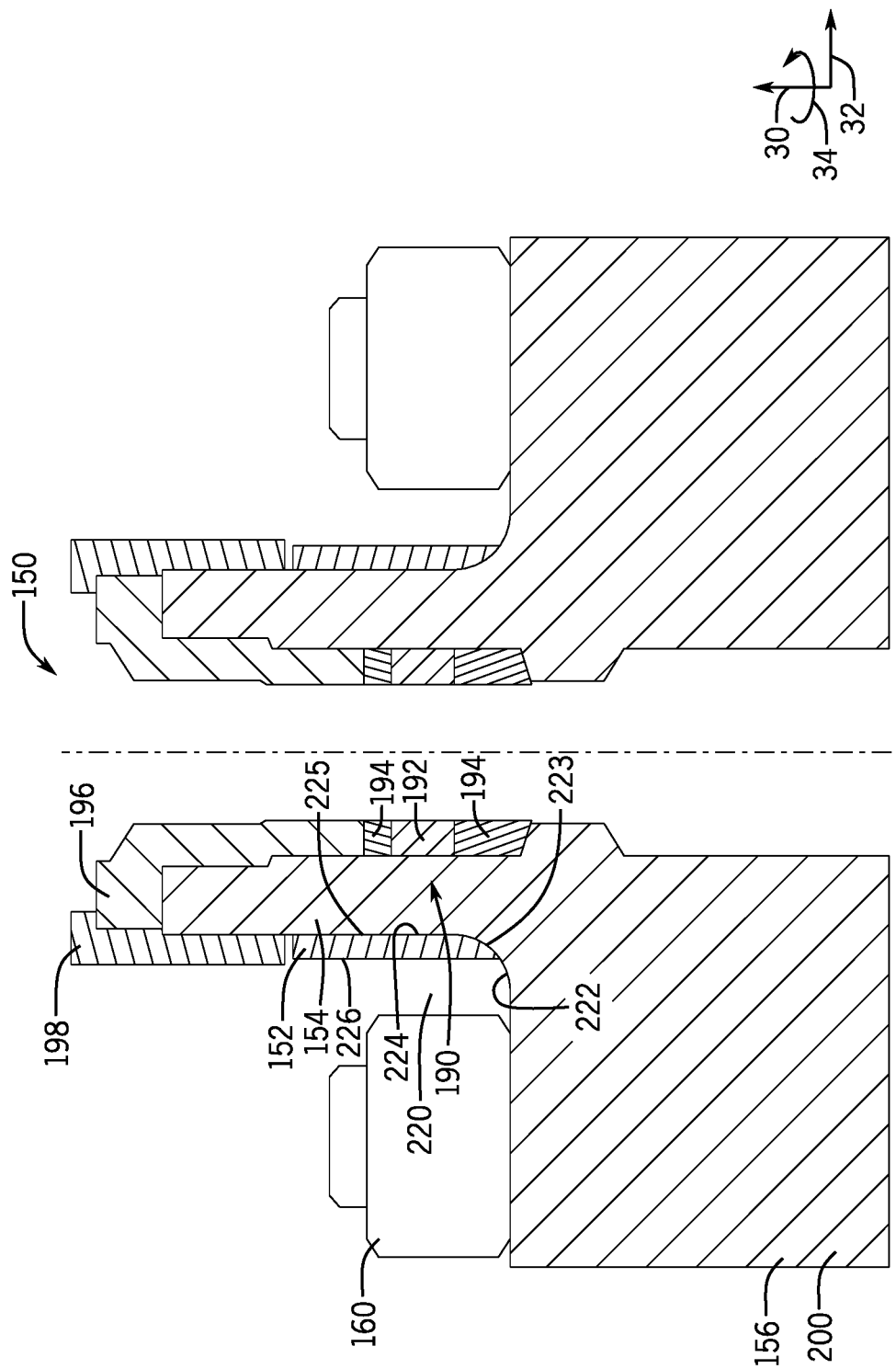

FIG. 10 is a cross-sectional side view of a gate valve having a valve sleeve with a housing and an insulating material, in accordance with an embodiment of the present disclosure;

FIG. 11 is a perspective view of the gate valve having the valve sleeve of FIG. 10, in accordance with an embodiment of the present disclosure;

FIG. 12 is a top view of the gate valve having the valve sleeve of FIG. 10, in accordance with an embodiment of the present disclosure;

FIG. 13 is a side view of the gate valve having the valve sleeve of FIG. 10, in accordance with an embodiment of the present disclosure; and FIG. 14 is a cross-sectional side view of a gate valve having a valve sleeve positioned between a fastener and a portion of a bonnet of the gate valve, in accordance with an embodiment of the present disclosure.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Mineral extraction systems (i.e., drilling and production systems) generally include a wide variety of fluid-handling components, such as various valves and conduits, which may contact fluids (e.g., production fluids) during drilling and/or production operations. For example, pipe sections (e.g., annular pipe sections) often include flanges (e.g., annular flanges) that may be coupled to one another via fasteners (e.g., threaded fasteners, such as nuts and bolts) to form a longer conduit (e.g., annular conduit). In such cases, seals (e.g., annular seals) may be supported between the flanges to seal fluid within the conduit and to block fluid flow across the seals at the interface between the flanges. However, when subjected to high temperatures, the fasteners may be unequally loaded, lose yield strength, and/or deform, which may lead to inadequate pressure on the seals supported between the flanges. Additionally, gate valves often include seals (e.g., annular seals formed from a packing material, such as graphite) positioned within a portion of a bonnet of the gate valve. However, when subjected to high temperatures, the seals may deform, which may lead to inadequate sealing within the gate valve.

Accordingly, embodiments of the present disclosure include sleeves (e.g., annular sleeves) for use in fluid-handling components. In some embodiments, the sleeves may be positioned about fasteners (e.g., threaded fasteners, such as bolts) that couple adjacent flanges to one another. For example, the sleeves may be positioned about fasteners that couple adjacent flanges of valve bodies or adjacent flanges of tubular sections to one another. In some embodiments, the sleeves may be positioned about fasteners that couple a bonnet of a gate valve to a body of the gate valve. In some embodiments, the sleeve may be a valve sleeve that is positioned about a portion of a bonnet of a gate valve. The disclosed embodiments generally shield or cover portions of fluid-handling components (e.g., the fasteners or seals of fluid-handling components) and are configured to reduce heat transfer to the portions of fluid-handling components, which in turn may enable adequate and reliable sealing under high temperature conditions, for example. The disclosed embodiments may generally improve fire resistance and enable the fluid-handling components to meet fire test specifications.

Figure 1:
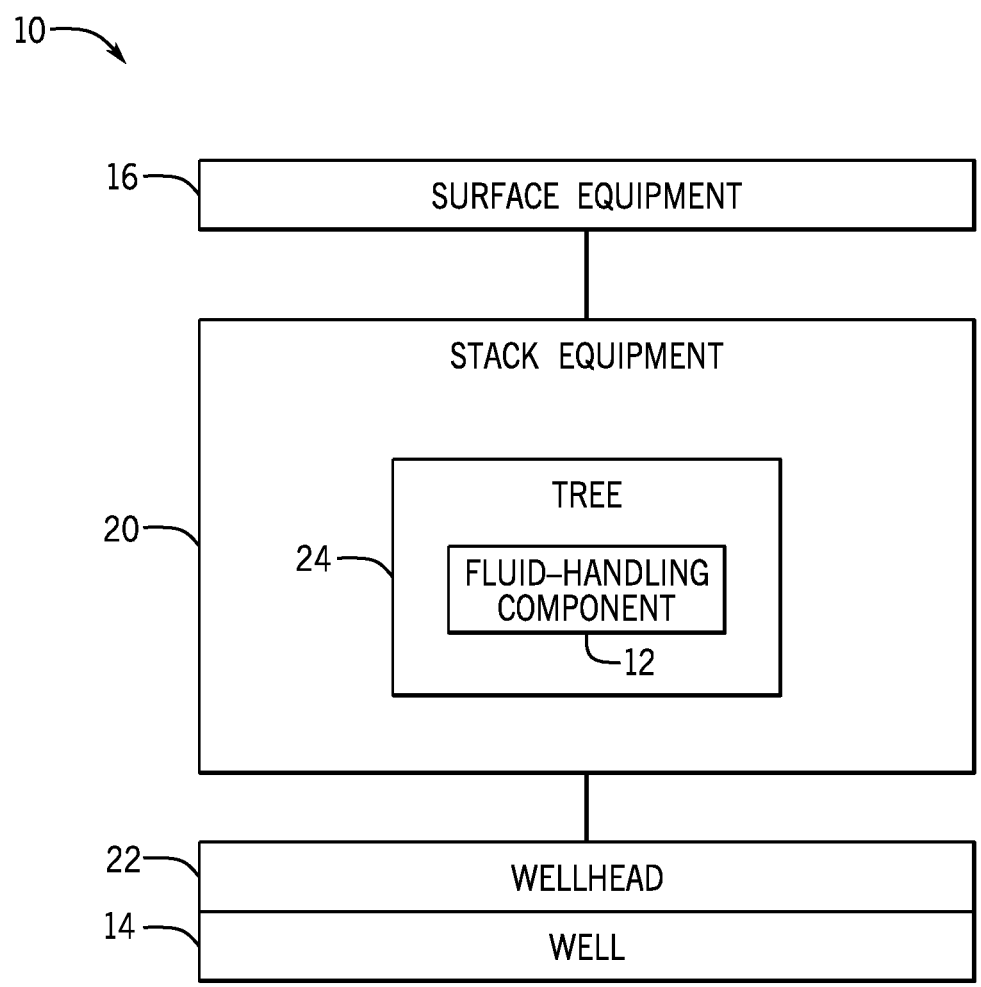
FIG. 1 is a block diagram of a mineral extraction system having a fluid-handling component, in accordance with an embodiment of the present disclosure.

With the foregoing in mind, FIG. 1 illustrates an embodiment of a mineral extraction system 10 (e.g., hydrocarbon extraction system) having a fluid-handling component 12 (e.g., a gate valve, choke valve, ball valve, check valve, pressure-regulating valve, valve body, conduit, pipe, tubular, hanger). In the illustrated embodiment, the system 10 is configured to facilitate the extraction of a resource, such as oil or natural gas, from a well 14. As shown, the system 10 includes a variety of equipment, such as surface equipment 16 and stack equipment 20, for extracting the resource from the well 14 via a wellhead 22. The surface equipment 16 may include a variety of devices and systems, such as pumps, conduits, valves, power supplies, cable and hose reels, control units, a diverter, a gimbal, a spider, and the like. As shown, the stack equipment 20 includes a production tree 24, also commonly referred to as a "Christmas tree." The tree 24 may include multiple fluid-handling components 12 that control the flow of an extracted resource out of the well 14 and upward toward the surface equipment 16 and/or that control the flow of injected fluids into the well 14. For example, the tree 24 may include various valves, conduits, flow meters, sensors, and so forth. While the fluid-handling component 12 is shown within the tree 24 in FIG. 1, it should be understood that the fluid-handling components 12 disclosed herein may be used in any portion of the system 10, such as the surface equipment 16, the stack equipment 20, the wellhead 22, and/or subsea equipment, for example. Furthermore, while FIG. 1 illustrates a land-based system, it should be understood that the fluid-handling components 12 may be part of an offshore system or a pipeline system.

Figure 2:
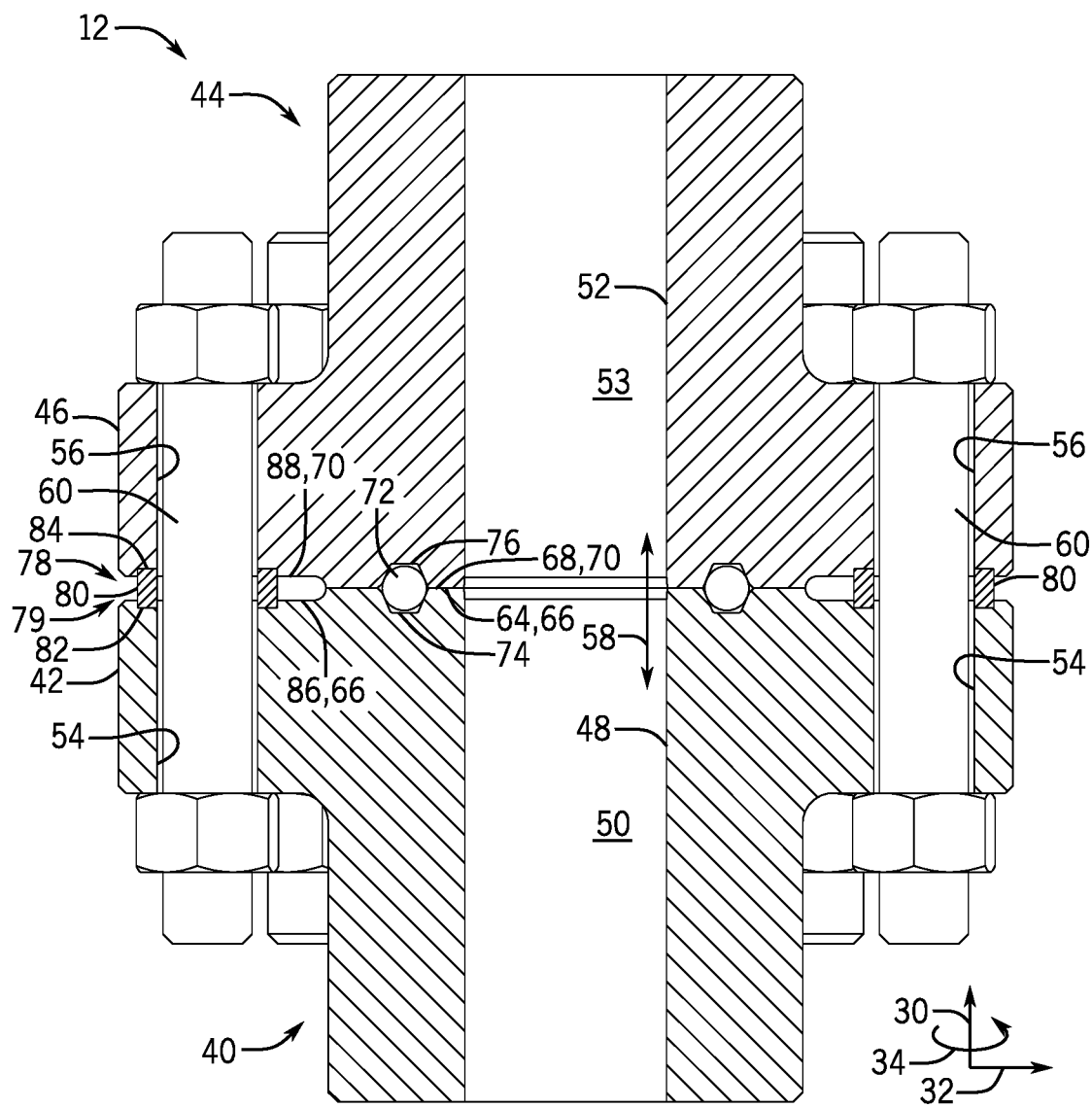
FIG. 2 is a cross-sectional side view of sleeves supported within recesses of adjacent flanges of the fluid-handling component of FIG. 1, in accordance with an embodiment of the present disclosure.

FIG. 2 is a cross-sectional side view of an embodiment of a portion of one fluid-handling component 12. To facilitate discussion, the fluid-handling component 12 and components disclosed herein may be described with reference to a longitudinal axis or direction 30, a radial axis or direction 32, and/or a circumferential axis or direction 34.

In the illustrated embodiment, the fluid-handling component 12 includes a first annular body 40 (e.g., pipe section, valve body, valve bonnet) having a first flange 42 (e.g., annular flange) and a second annular body 44 (e.g., pipe section, valve body, valve bonnet) having a second flange 46 (e.g., annular flange). The first annular body 40 and the second annular body 44 may be constructed of any of a variety of materials, including but not limited to cast iron, ductile iron, cast carbon steel, gun metal, stainless steel, alloy steels, corrosion resistant alloys, and/or forged steels, for example. As shown, the first annular body 40 has a first inner surface 48 (e.g., radially-inner annular surface or fluid-contacting surface) that defines a first bore 50, and the second annular body 44 has a second inner surface 52 (e.g., radially-inner annular surface or fluid-contacting surface) that defines a second bore 53. During operation, fluid may flow from the first bore 50 to the second bore 53, or vice versa, as shown by arrow 58. In the illustrated embodiment, first openings 54 (e.g., through-holes) are positioned at discrete locations circumferentially about the first flange 42, and second openings 56 (e.g., through-holes) are positioned at discrete locations circumferentially about the second flange 44.

In some embodiments, the first annular body 40 and the second annular body 44 are coupled together via fasteners 60 (e.g., threaded fasteners, such as nuts and bolts). As shown, each fastener 60 may extend through aligned first and second openings 54, 56 and may be adjusted (e.g., torqued) until a radially-inner portion 64 of a first surface 66 (e.g., longitudinally-facing annular surface) of the first flange 42 contacts a radially-inner portion 68 of a second surface 70 (e.g., longitudinally-facing annular surface) of the second flange 46 and/or until a seal 72 (e.g., annular seal) supported within a first groove 74 (e.g., annular groove) formed in the radially-inner portion 64 of the first surface 66 and within a second groove 76 (e.g., annular groove) formed in the radially-inner portion 68 of the second surface 70 is energized (e.g., by being compressed between the flanges 42, 46).

In the illustrated embodiment, a sleeve 80 (e.g., annular sleeve) is provided about a portion of each fastener 60 (e.g., extends about a circumference of each fastener 60). For example, as shown, one sleeve 80 is positioned about one fastener 60, and another sleeve 80 is a positioned about another fastener 60. It should be appreciated that the fluid-handling component 12 may include any number (e.g., 1, 2, 3, 4, 5, 6, 8, or more) of fasteners 60 and corresponding sleeves 80. In the illustrated embodiment, each sleeve 80 is a one-piece (e.g., gaplessly continuous) annular structure. Each sleeve 80 may be positioned about a center region (e.g., midpoint along the longitudinal axis 30) of the fastener 60 and/or about a portion of the fastener 60 that is positioned at or extends across a gap 78 (e.g., longitudinally-extending and annular gap) at an interface 79 between the flanges 42, 46.

In some embodiments, each sleeve 80 may be supported within a respective first recess 82 (e.g., annular recess or counter-bore) formed in the first flange 42 and/or within a respective second recess 84 (e.g., annular recess or counter-bore) formed in the second flange 46. For example, in the illustrated embodiment, the first recesses 82 are formed in a radially-outer portion 86 of the first surface 66 of the first flange 42, and the second recesses 84 are formed in a radially-outer portion 88 of the second surface 70 of the second flange 46.

The fluid-handling component 12 may be assembled via any of a variety of techniques. In some embodiments, the sleeves 80 may be positioned within respective first recesses 82 formed in the first flange 42 and the seal 72 may be positioned within the first groove 74 formed in the first flange 42. Then, the second body 44 may be positioned proximate to the first body 40 and oriented such that the openings 54, 56 align with one another, the sleeves 80 are positioned within respective second recesses 84 formed in the second flange 46, and the seal 72 is positioned within the second groove 76. Then, each fastener 60 may be inserted through the corresponding openings 54, 56 and through the corresponding sleeve 80 and adjusted until the radially-inner portion 64 of the first surface 66 of the first flange 42 contacts the radially-inner portion 68 of the second surface 70 of the second flange 46 and/or until the seal 72 is energized. It should be appreciated that, in some embodiments, each fastener 60 may be inserted through the corresponding first opening 54 and through the corresponding sleeve 80 prior to positioning the second body 44 proximate to the first body 40.

In the illustrated embodiment, the radially-outer portion 86 of the first surface 66 and the radially-inner portion 64 of the first surface 66 do not form a single flat surface, but instead are staggered or offset relative to the longitudinal axis 30. Similarly, the radially-outer portion 88 of the second surface 70 and the radially-inner portion 68 of the second surface 70 do not form a single flat surface, but instead are staggered or offset along the longitudinal axis 30. Such a configuration may enable the radially-inner portions 64, 68 to contact one another and/or facilitate energizing the seal 72, while also facilitating placement of the sleeves 80. The illustrated configuration may also facilitate visualization, inspection, repair, replacement, or maintenance of the sleeves 80 and other components. However, it should be appreciated that, in some embodiments, the first surface 66 and/or the second surface 68 may be flat surfaces (except for the grooves 74, 76 and recesses 82, 84) that extend radially across the first and second flanges 42, 46, respectively.

In operation, the sleeves 80 may shield, cover, and/or protect the fasteners 60 from high temperatures. For example, during a fire, the sleeves 80 may reduce heat transfer to the fasteners 60, thereby reducing losses in yield strength of the fasteners 60 and/or reducing deformation of the fasteners 60 due to high temperatures. In turn, the strength and stability of the fasteners 60 may maintain adequate pressure on the seal 72 supported between the first and second flanges 42, 46 and enable the seal 72 to block fluid flow across the seal 72 during the exposure to the high temperatures.

It should be appreciated that multiple fasteners 60 (e.g., 2, 3, 4, 5, or all fasteners 60 that couple the first annular body 40 and the second annular body 44 to one another) may be surrounded by one sleeve 80. For example, the sleeve 80 may be an annular structure that circumferentially surrounds the bore 53, and the sleeve 80 may include multiple openings positioned circumferentially about the sleeve 80 that each receive a respective fastener 60. In such embodiments, the sleeve 80 may be positioned within an annular recess that is formed in the first flange 42 and within an annular recesses formed in the second flange 46. Such a configuration with one sleeve 80 circumferentially surrounding multiple fasteners 60 may also have the cross-sectional side view that is shown in FIG. 2.

Figure 3:
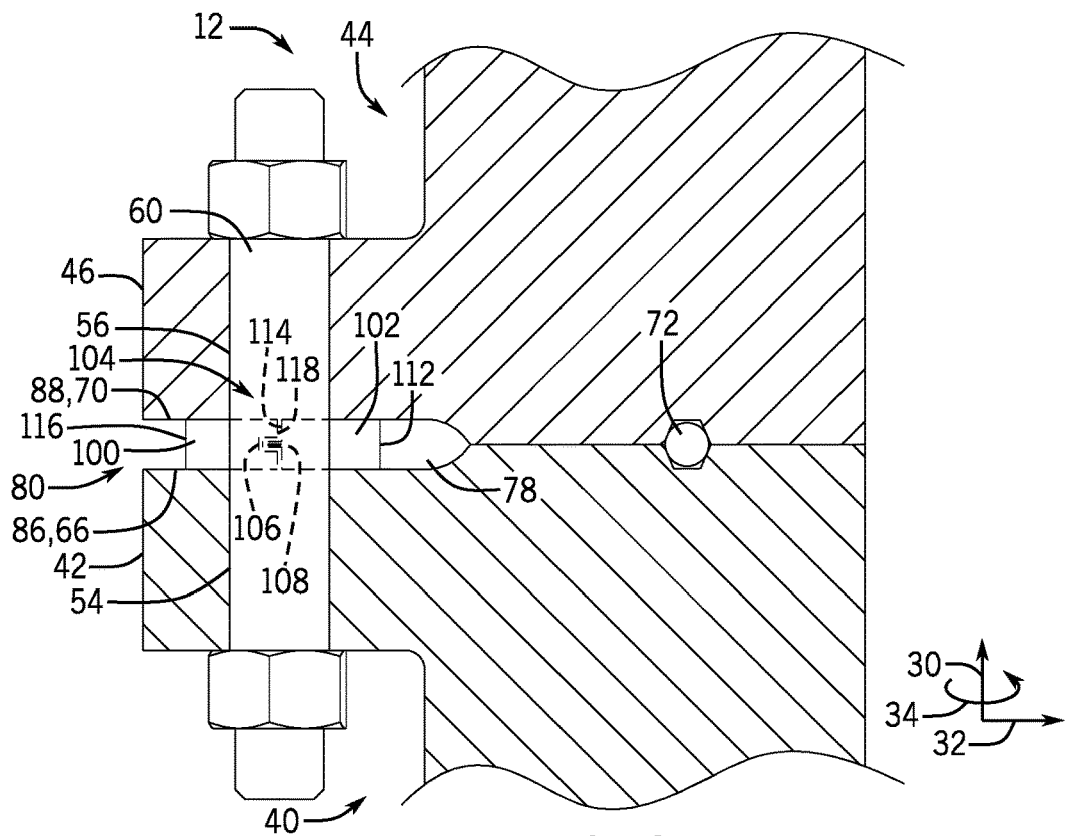
FIG. 3 is a cross-sectional side view of a sleeve having multiple segments positioned between adjacent flanges of the fluid-handling component of FIG. 1, in accordance with an embodiment of the present disclosure.
Figure 4:
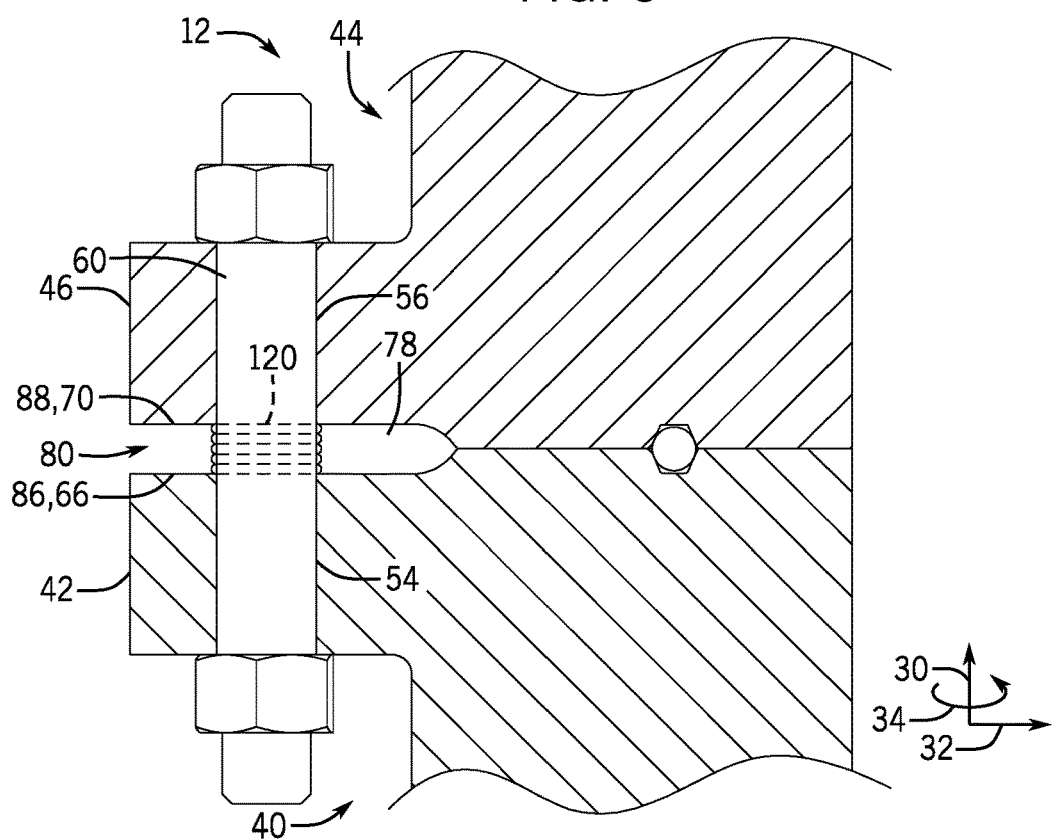
FIG. 4 is a cross-sectional side view of a sleeve formed from a rope positioned between adjacent flanges of the fluid-handling component of FIG. 1, in accordance with an embodiment of the present disclosure.
Figure 5:
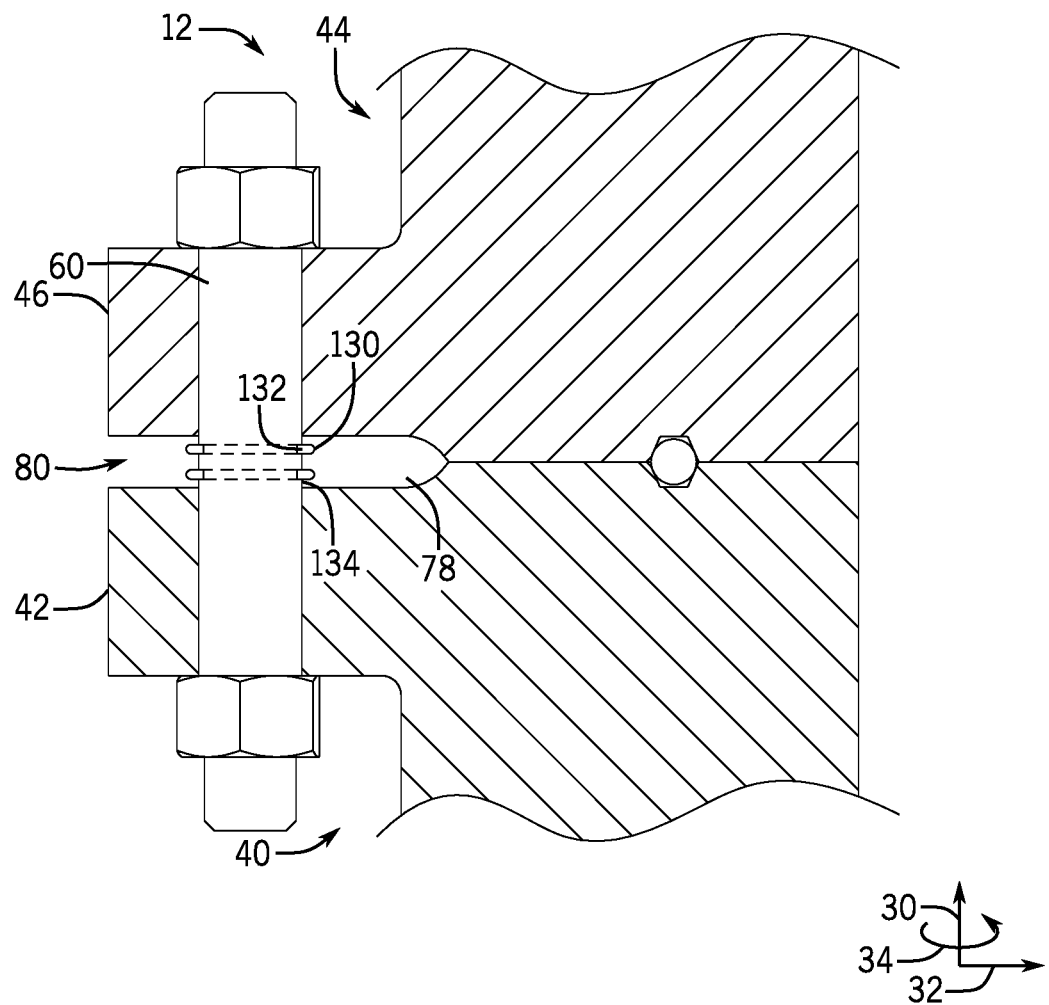
FIG. 5 is a cross-sectional side view of a sleeve formed from one or more ropes supported within one or more grooves formed in a fastener that couples adjacent flanges of the fluid-handling component of FIG. 1 to one another, in accordance with an embodiment of the present disclosure.

FIGS. 3-5 illustrate example embodiments of sleeves 80 that may be utilized in the fluid-handling component 12. In particular, FIG. 3 is a cross-sectional side view of one sleeve 80 (e.g., annular sleeve) having a first segment 100 (e.g., non-annular segment) and a second segment 102 (e.g., non-annular segment) that may be configured to couple to one another via interfaces 104 (e.g., latching interface) to form the sleeve 80. To facilitate discussion, one interface 104 between the first segment 100 and the second segment 102 is illustrated in dotted lines; however, in some embodiments, the sleeve 80 includes two interfaces 104 (e.g., diametrically opposed interfaces) that join the first segment 100 and the second segment 102 to one another. As shown, the first segment 100 includes a slot 106 that is configured to receive a key 108 of the second segment 102 to couple the first segment 100 and the second segment 102 to one another. However, in some embodiments, the first segment 100 may include the key 108 and the second segment 102 may include the slot 106. Furthermore, it should be appreciated that the first segment 100 and second segment 102 may be coupled to one another via any suitable latching or coupling mechanism, including a key-slot interface, interference fit, friction fit, or the like. It should also be appreciated that more than two segments (e.g., 3, 4, or more segments) may be coupled together to form the sleeve 80.

As shown in FIG. 3, the sleeve 80 is positioned between the radially-outer portion 86 of the first surface 66 of the first flange 42 and the radially-outer portion 88 of the second surface 70 of the second flange 46. The illustrated configuration may enable assembly and/or disassembly of the sleeve 80 about the fastener 60 while the fastener 60 is positioned within the openings 54, 56 of the flanges 42, 46. Thus, the sleeve 80 may be retrofitted to existing fluid-handling components 12. Furthermore, the sleeve 80 may be disassembled and removed as part of a maintenance operation, and another sleeve 80 may be assembled onto the fastener 60 without removing the fastener 60 from the openings 54, 56 of the flanges 42, 46.

For example, to assemble the sleeve 80 of FIG. 3 about the fastener 60, the second segment 102 may be inserted into the gap 78 between the radially-outer portion 86 of the first surface 66 of the first flange 42 and the radially-outer portion 88 of the second surface 70 of the second flange 46. The second segment 102 may be manipulated and adjusted (e.g., slid and rotated about the fastener 60) until a center portion 112 of the second segment 102 is positioned radially-inwardly of the fastener 60 (e.g., between the fastener 60 and the seal 72 along the radial axis 32) and end portions 114 of the second segment 102 are facing radially-outwardly to facilitate coupling the second segment 102 to the first segment 100 via the interface 104. Then, the first segment 100 may be inserted into the gap 78 with a center portion 116 of the first segment 100 positioned radially-outwardly of the fastener 60 and end portions 118 facing radially-inwardly to facilitate coupling the first segment 100 to the second segment 102 via the interface 104. Once coupled together, the first segment 100 and the second segment 102 form the annular sleeve 80 that shields, covers, and/or protects the fastener 60 from high temperatures.

It should be appreciated that the first segment 100 and the second segment 102 may be assembled via other techniques to form the sleeve 80. For example, in some embodiments, the first segment 100 and the second segment 102 may be inserted into the gap 78, coupled to one another via the interfaces 104, and then manually rotated until the interfaces 104 are at desired locations (e.g., facing an adjacent fastener 60 and not positioned radially-outwardly of the fastener 60 to avoid high temperatures being applied directly to the interfaces 104). Additionally, in some embodiments, the fastener 60 may be loosened during assembly or disassembly of the sleeve 80. It should also be appreciated that, in some embodiments, the sleeve 80 of FIG. 3 may be supported within one or more recesses (e.g., recesses 82, 84 of FIG. 2).

FIG. 4 is a cross-sectional side view of one sleeve 80 (e.g., annular sleeve) formed from a rope 120 (e.g., ceramic rope, tape, fiber, wire, cable, cord) wound (e.g., twisted, bent, looped, wrapped) about the fastener 60 to form the sleeve 80 (e.g., annular sleeve). To facilitate discussion, portions of the rope 120 are illustrated in dotted lines.

As shown in FIG. 4, the sleeve 80 is positioned between the radially-outer portion 86 of the first surface 66 of the first flange 42 and the radially-outer portion 88 of the second surface 70 of the second flange 46. The illustrated configuration may enable assembly and/or disassembly of the sleeve 80 about the fastener 60 while the fastener 60 is positioned within the openings 54, 56 of the flanges 42, 46. Thus, the sleeve 80 may be retrofitted to existing fluid-handling components 12. Furthermore, the sleeve 80 may be disassembled and removed as part of a maintenance operation, and another sleeve 80 may assembled onto the fastener 60 without removing the fastener 60 from the openings 54, 56 of the flanges 42, 46.

For example, to assemble the sleeve 80 of FIG. 4 about the fastener 60, the rope 120 may be inserted into the gap 78 and may then be manipulated to wrap about the fastener 60 until a portion of the fastener 60 (e.g., an exposed portion of the fastener 60 between the flanges 42, 46) is surrounded by the rope 120. The rope 120 may be coupled to the fastener 60, such as by tying the rope 120 about the fastener 60, for example. Once assembled, the rope 120 forms the annular sleeve 80 that shields, covers, and/or protects the fastener 60 from high temperatures.

FIG. 5 is a cross-sectional side view of one sleeve 80 formed of one or more ropes 130 (e.g., annular ceramic rope, tape, fiber, wire, cable, cord) supported within one or more grooves 132 (e.g., annular grooves) formed in a radially-outer surface 134 (e.g., annular surface) of the fastener 60. In some embodiments, the one or more ropes 130 may be wound (e.g., twisted, bent, looped, wrapped) about the fastener 60 to form the sleeve 80 (e.g., annular sleeve). To facilitate discussion, portions of the multiple ropes 130 are illustrated in dotted lines.

As shown in FIG. 5, the sleeve 80 is positioned between the radially-outer portion 86 of the first surface 66 of the first flange 42 and the radially-outer portion 88 of the second surface 70 of the second flange 46. The illustrated configuration may enable assembly and/or disassembly of the sleeve 80 about the fastener 60 while the fastener 60 is positioned within the openings 54, 56 of the flanges 42, 46. Thus, the sleeve 80 may be retrofitted to existing fluid-handling components 12. Furthermore, the sleeve 80 may be disassembled and removed as part of a maintenance operation, and another sleeve 80 may assembled onto the fastener 60 without removing the fastener 60 from the openings 54, 56 of the flanges 42, 46.

It should be appreciated that, in some embodiments, the one or more ropes 130 may be coupled to the fastener 60 prior to insertion of the fastener 60 into the openings 54, 56. For example, in some cases, the one or more ropes 130 may not protrude radially-outwardly from the radially-outer surface 132 of the fastener 60 and/or may be coupled to the fastener 60 at manufacturing. Once assembled, the one or more ropes 130 form the annular sleeve 80 that shields, covers, and/or protects the fastener 60 from high temperatures.

It should also be appreciated that the sleeves 80 of FIGS. 2-5 may be used with fasteners that couple any of a variety of components to one another in any portion of the mineral extraction system 10. Furthermore, the sleeves 80 disclosed herein may be manufactured from any of a variety of materials (e.g., ceramic materials, composite materials, metal or metal alloy materials, or polymer materials). For example, in some embodiments, the sleeves 80 may be manufactured from ceramics, zirconium-based materials (e.g., zirconium dioxide), silicon-based materials (e.g., silicon nitride), oxides, non-oxides, glasses, and various salts, or similar materials, for example. In some embodiments, the sleeves 80 may be manufactured from intumescent materials (e.g., materials that undergo an endothermic reaction process that causes the material to swell in response to heat exposure). In some embodiments, the sleeves 80 may include a metal (e.g., metal or metal alloy) material or a composite material with a coating, such as a silicone coating or an intumescent coating. In some embodiments, the sleeves 80 may be manufactured from an inert material and/or a material having a generally low thermal conductivity, such as less than approximately 30, 25, 20, 15, 10, 5, 4, or 3 Watts per meter-Kelvin (W/(mK)) at room temperature or between approximately 0 to 30, 3 to 20, or 4 to 10 W/(mK) at room temperature.

In addition to or as an alternative to the sleeves 80 illustrated in FIGS. 2-5, it may be desirable to include a valve sleeve that circumferentially surrounds a portion of a valve (e.g., a gate valve, choke valve, ball valve, check valve, pressure-regulating valve, valve body). With the foregoing in mind, FIGS. 6-14 illustrate embodiments of valve sleeves that may be utilized to shield, cover, and/or protect components of the valve from high temperatures.

Figure 6:
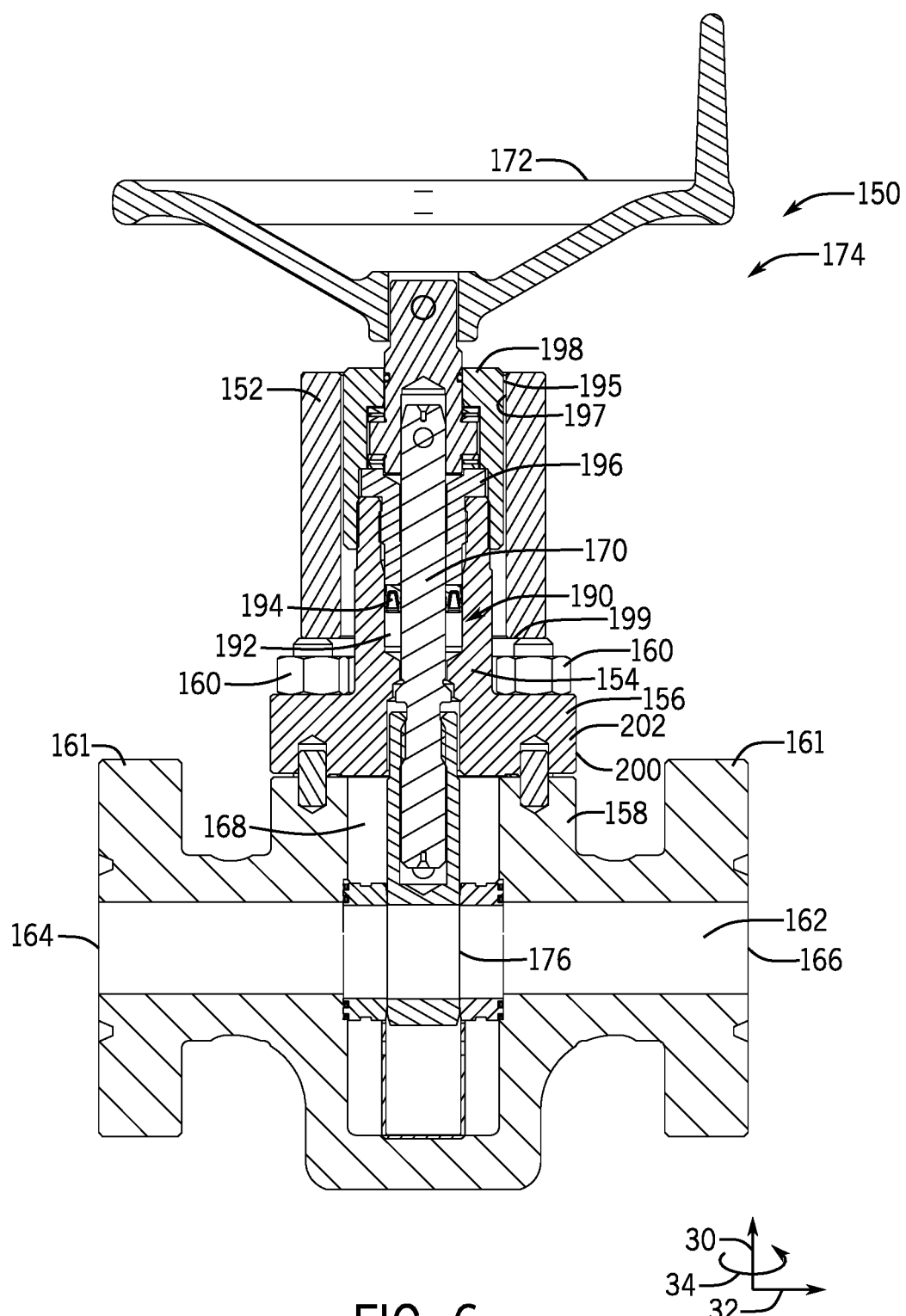
FIG. 6 is a cross-sectional side view of a gate valve having a valve sleeve positioned about a portion of a bonnet of the gate valve, in accordance with an embodiment of the present disclosure.

FIG. 6 is a cross-sectional side view of an embodiment of a gate valve 150 having a valve sleeve 152 (e.g., annular sleeve) positioned about a neck 154 (e.g., annular neck) of a bonnet 156 (e.g., annular bonnet) of the gate valve 150. As shown, the gate valve 150 includes a valve body 158 that is coupled to the bonnet 156 via fasteners 160 (e.g., threaded fasteners, such as nuts and bolts). It should be appreciated that the sleeves 80 illustrated in FIGS. 2-5 may be positioned about portions of the fasteners 160 and/or about portions of other fasteners that couple flanges 161 of the valve body 158 to other structures. The valve body 158 and/or the bonnet 156 may be constructed of any of a variety of materials, including but not limited to cast iron, ductile iron, cast carbon steel, gun metal, stainless steel, alloy steels, corrosion resistant alloys, and/or forged steels, for example.

In the illustrated embodiment, the valve body 158 includes a bore 162 that extends laterally between an inlet 164 and an outlet 166, and a cavity 168 that extends longitudinally to receive a gate 170. In operation, an actuator 172 drives the gate 170 longitudinally through the cavity 168 to adjust the gate valve 150 between the illustrated open position 174 and a closed position. As shown, in the open position 174, an opening 176 of the gate 150 aligns with the bore 162 to enable fluid within the bore 162 to flow across the gate 170. In the closed position, the opening 176 of the gate 170 does not align with the bore 162 and the gate 170 blocks fluid flow across the gate 170.

In the illustrated embodiment, a packing assembly 190 (e.g., an annular packing assembly) circumferentially surrounds at least a portion of the gate 170. In some embodiments, the packing assembly 190 includes a packing material 192 (e.g., an annular packing material or a flexible or compressible material, such as graphite) and one or more support rings 194 (e.g., header rings). As shown, a gland 196 (e.g., an annular gland nut or annular threaded gland) is positioned axially above the packing assembly 190. In some embodiments, the gland 196 is threadably coupled to the neck 154 of the bonnet 156. In such embodiments, rotation of the gland 196 in the circumferential direction 34 may cause the gland 196 to move in the longitudinal direction 30 relative to the bonnet 156, thereby adjusting compression of the packing assembly 190. The packing assembly 190 may form a seal configured to block fluid flow. In the illustrated embodiment, the gate valve 150 includes a bearing cap 198 (e.g., annular cap) that may be threadably coupled to the neck 154 of the bonnet 156. In operation, rotation of the actuator 172 drives rotation of the bearing cap 198, which in turn drives movement of the gate 170 in the longitudinal direction 30 to adjust the gate valve 150 between the open position 174 and the closed position.

As shown, the packing assembly 190 and at least a portion of the gland 196 are positioned within the neck 154 of the bonnet 156 (e.g., the neck 154 circumferentially surrounds the packing assembly 192 and at least the portion of the gland 196). However, the neck 154 is relatively thin (e.g., in the radial direction 32). The valve sleeve 152 positioned about the neck 154 advantageously shields at least the packing assembly 190 from high temperatures (e.g., during a fire). As shown, an inner surface 195 (e.g., radially-inner annular surface) of the valve sleeve 152 contacts and/or is positioned proximate to an outer surface 197 (e.g., radially-outer annular surface) of the bearing cap 198, and a lower surface 199 (e.g., longitudinally-facing annular surface) of the valve sleeve 152 contacts and is supported by the fasteners 160. In some embodiments, the valve sleeve 152 is sized and positioned to circumferentially surround at least a portion of the packing assembly 190, the gland 196, and the bearing cap 198. In the illustrated embodiment, the valve sleeve 152 does not extend radially-outwardly beyond a radially-outer surface 200 (e.g., annular surface) of a flange 202 (e.g., annular flange) of the bonnet 156 (e.g., a diameter of the valve sleeve 152 is less than or equal to a diameter of the flange 202), and thus, the valve sleeve 152 may not interfere with inspections and may not significantly reduce space for operators to work around the gate valve 150. Additionally, the valve sleeve 152 does not hide or circumferentially surround the fasteners 160, and thus, the fasteners 160 remain visible to enable the operator to facilitate inspection of the fasteners 160 (e.g., for corrosion) and removal of the fasteners 160.

In some embodiments, the valve sleeve 152 may be a single, gaplessly continuous structure that may be positioned about the neck 154 during assembly of the gate valve 150 (e.g., slid about the neck 154 prior to attachment of the actuator handle). However, in some embodiments, the valve sleeve 152 may be formed from segments that include one or more latching interfaces to facilitate efficient attachment and/or detachment of the valve sleeve 152. It should be appreciated that the valve sleeve 152 may be coupled to a component of the gate valve 150 (e.g., the neck 154 or the bearing cap 198) via one or more fasteners (e.g., threaded fasteners, such as nuts and bolts), or the valve sleeve 152 may be maintained in its position about the neck 154 via clips, stops, pins, or the like that are positioned to block movement of the valve sleeve 152 relative to the neck 154. In some embodiments, the inner surface 195 of the valve sleeve 152 and the outer surface 197 of the bearing cap 198 may be coupled via a threaded interface. Alternatively, the inner surface 195 and the outer surface 197 may be smooth (e.g., non-threaded surfaces).

Figure 8:
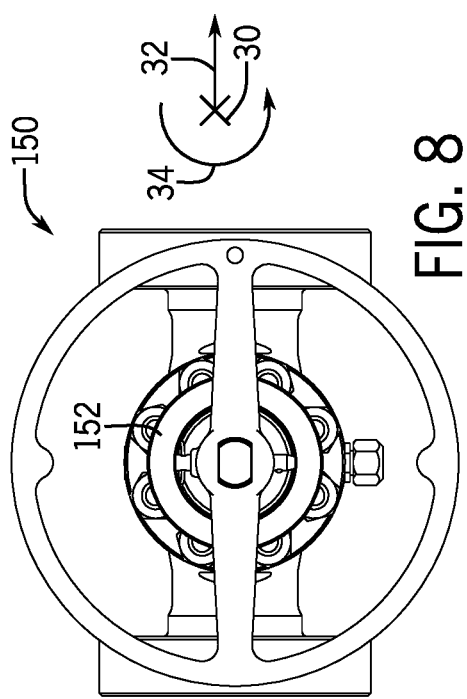
FIG. 8 is a top view of the gate valve having the valve sleeve of FIG. 6, in accordance with an embodiment of the present disclosure.
Figure 9:
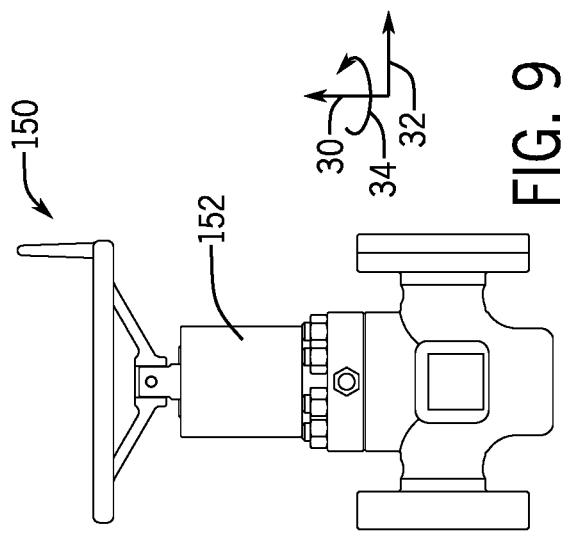
FIG. 9 is a side view of the gate valve having the valve sleeve of FIG. 6, in accordance with an embodiment of the present disclosure.
Figure 7:
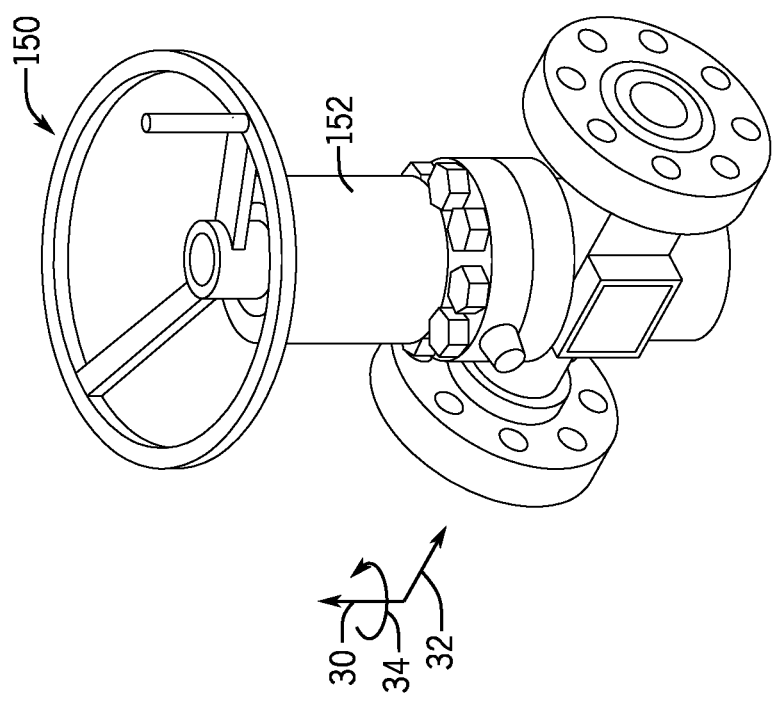
FIG. 7 is a perspective view of the gate valve having the valve sleeve of FIG. 6, in accordance with an embodiment of the present disclosure.

FIG. 7 is a perspective view of the gate valve 150 having the valve sleeve 152 of FIG. 6, FIG. 8 is a top view of the gate valve 150 having the valve sleeve 152 of FIG. 6, and FIG. 9 is a side view of the gate valve 150 having the valve sleeve 152 of FIG. 6. In operation, the valve sleeve 152 may shield, cover, and/or protect the packing assembly 190 from high temperatures. For example, during a fire, the valve sleeve 152 may reduce heat transfer to the packing assembly 190, thereby reducing deformation of the packing assembly 190 due to high temperatures and enabling the packing assembly 190 to maintain an adequate seal to block fluid flow.

FIGS. 10-15 illustrate example embodiments of valve sleeves 152 that may be utilized with gate valves 150. In particular, FIG. 10 is a cross-sectional side view of an example of the valve sleeve 152 having a housing 210 (e.g., annular housing) that may be filled with an insulating material 212 (e.g., air, cement, clay, mud, foam). In the illustrated embodiment, the housing 210 includes an inner surface 211 (e.g., radially-inner annular surface), an outer surface 213 (e.g., radially-outer annular surface), and a lower surface 215 (e.g., longitudinally-facing annular surface) that extends radially between ends of the inner and outer surfaces 211, 213. Thus, the housing 210 is open on one side (e.g., side proximate the actuator 172), which may facilitate inspection, replacement, or adjustment of the insulating material 212 during operation of the gate valve 150, for example. In some embodiments, the housing 210 may encapsulate or fully surround the insulating material 212 (e.g., the housing 210 may include a top surface extending radially between other ends of the inner and outer walls 211, 213). Additionally, the valve sleeve 152 does not hide or cover the fasteners 60, and thus, the fasteners 60 remain visible to enable the operator to facilitate inspection of the fasteners 60 (e.g., for corrosion).

As shown in FIG. 10, the valve sleeve 152 circumferentially surrounds at least a portion of the neck 154. As shown, the inner surface 211 (e.g., radially-inner annular surface) of the valve sleeve 152 contacts or is proximate to the outer surface 197 of the bearing cap 198, and the lower surface 215 of the valve sleeve 152 contacts and is supported by the fasteners 160. As shown, the valve sleeve 152 is sized and positioned to circumferentially surround at least portions of the packing assembly 190, the gland 196, and the bearing cap 198. In the illustrated embodiment, the valve sleeve 152 does not extend radially-outwardly beyond the radially-outer surface 200 of the flange 202 or the bonnet 156. In some embodiments, the housing 210 is a single, gaplessly continuous structure that may be positioned about the neck 154 during assembly of the gate valve 150 (e.g., slid about the neck 154 prior to attachment of the actuator handle). It should be appreciated that the valve sleeve 152 may be coupled to a component of the gate valve 150 (e.g., the neck 154 or the bearing cap 198) via one or more fasteners (e.g., threaded fasteners, such as nuts and bolts), or the valve sleeve 152 may be maintained in its position about the neck 154 via clips, stops, pins, or the like that are positioned to block movement of the valve sleeve 152 relative to the neck 154. In some embodiments, the inner surface 211 of the housing 210 of the valve sleeve 152 and the outer surface 197 of the bearing cap 198 may be coupled via a threaded interface. Alternatively, the inner surface 211 and the outer surface 197 may be smooth (e.g., non-threaded surfaces).

FIG. 11 is a perspective view of the gate valve 150 having the valve sleeve 152 of FIG. 10, FIG. 12 is a top view of the gate valve 150 having the valve sleeve 152 of FIG. 10, and FIG. 13 is a side view of the gate valve 150 having the valve sleeve 152 of FIG. 10. In operation, the valve sleeve 152 having the housing 210 and the insulating material 212 may shield, cover, and/or protect the packing assembly 190 from high temperatures. For example, during a fire, the valve sleeve 152 may reduce heat transfer to the packing assembly 190, thereby reducing deformation of the packing assembly 190 due to high temperatures and enabling the packing assembly 190 to maintain an adequate seal to block fluid flow.

FIG. 14 is a cross-sectional side view of an example of the valve sleeve 152 that fits in a space 220 (e.g., annular space) defined between the fasteners 160 and the neck 154 along the radial axis 32. In the illustrated embodiment, the valve sleeve 152 is positioned between a surface 222 (e.g., longitudinally-facing annular surface) of the flange 200 and the bearing cap 198 along the longitudinal axis 30. In some embodiments, an end surface 223 (e.g., annular surface) and/or a radially-inner surface 224 (e.g., annular surface) of the valve sleeve 152 may have a shape that corresponds to a shape of the bonnet 156, thereby enabling the valve sleeve 152 to contact and be supported by the bonnet 156. In the illustrated embodiment, the radially-inner surface 224 of the valve sleeve 152 may contact the neck 154; however, a radially-outer surface 226 (e.g., annular surface) of the valve sleeve 152 is separated from (e.g., does not contact) the fasteners 160. Such a configuration may enable the fasteners 160 to be adjusted (e.g., via a wrench to remove the bonnet 156 from the body 158) without interference from the valve sleeve 152 and without removing the valve sleeve 152 from the bonnet 156. Additionally, the valve sleeve 152 does not hide or cover the fasteners 160, and thus, the fasteners 160 remain visible to enable the operator to facilitate inspection of the fasteners 160 (e.g., for corrosion).

As shown in FIG. 14, the valve sleeve 152 circumferentially surrounds at least a portion of the neck 154. In some embodiments, the valve sleeve 152 is sized and positioned to circumferentially surround at least portions of the packing assembly 190 (e.g., the packing material 192 and one or more support rings 194) and/or the gland 196. In some embodiments, the valve sleeve 152 is a single, gaplessly continuous structure that may be positioned about the neck 154 during assembly of the gate valve 150 (e.g., slid about the neck 154 prior to attachment of the bearing cap 198). However, in some embodiments, the valve sleeve 152 may be formed from segments that include one or more latching interfaces to facilitate efficient attachment and/or detachment of the valve sleeve 152. It should be appreciated that the valve sleeve 152 may be coupled to a component of the gate valve 150 (e.g., the neck 154 or the bearing cap 198) via one or more fasteners (e.g., threaded fasteners, such as nuts and bolts), or the valve sleeve 152 may be maintained in its position about the neck 154 via the bearing cap 198, clips, stops, pins, or the like that are positioned to block movement of the valve sleeve 152 relative to the neck 154. In some embodiments, the radially-inner surface 224 of the valve sleeve 152 and an outer surface 225 of the neck 154 may be coupled via a threaded interface. Alternatively, the inner surface 224 and the outer surface 225 may be smooth (e.g., non-threaded surfaces).

While FIGS. 6-14 illustrate the valve sleeve 152 positioned about the bonnet 156 of the gate valve 150, it should be appreciated that the valve sleeve 152 may be utilized with any of a variety of valves or to surround any of a variety of conduits or components within the mineral extraction system 10. For example, the valve sleeve 152 may be positioned circumferentially about a portion of a choke valve, a ball valve, a check valve, or any type of pressure-regulating valve. Furthermore, the valve sleeve 152 may be positioned circumferentially about any type of conduit (e.g., pipe, tubular, hanger).

It should also be appreciated that the valve sleeves 152 of FIGS. 6-14 may be manufactured from any of a variety of materials (e.g., ceramic materials, composite materials, metal or metal alloy materials, or polymer materials). For example, in some embodiments, the valve sleeves 152 may be manufactured from ceramics, zirconium-based materials (e.g., zirconium dioxide), silicon-based materials (e.g., silicon nitride), oxides, non-oxides, glasses, and various salts, for example. In some embodiments, the valve sleeves 152 may be manufactured from intumescent materials (e.g., materials that swell in response to heat exposure). In some embodiments, the valve sleeves 152 may include a metal (e.g., metal or metal alloy) material or a composite material with a coating, such as a silicone coating or an intumescent coating. In some embodiments, the valve sleeves 152 may be manufactured from an inert material and/or a material having a generally low thermal conductivity, such as less than approximately 30, 25, 20, 15, 10, 5, 4, or 3 W/(mK) at room temperature or between approximately 0 to 30, 3 to 20, or 4 to 10 W/(mK) at room temperature. Furthermore, with respect to the valve sleeve 152 shown in FIGS. 10-13, the housing 210 of the valve sleeve 152 may be formed from one material (e.g., the materials described above), and the insulating material 212 may include a different material, such as an insulating material (e.g., e.g., air, cement, clay, mud, foam).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising:
a first body of a fluid-handling component, wherein the first body defines a first bore and comprises a first flange comprising a first longitudinally-facing surface and a plurality of first openings;
a second body of the fluid-handling component, wherein the second body defines a second bore and comprises a second flange comprising a second longitudinally-facing surface and a plurality of second openings;
a first fastener configured to extend through one of the plurality of first openings of the first flange and one of the plurality of second openings of the second flange to couple the first body to the second body such that the first bore is fluidly coupled to the second bore and such that the first longitudinally-facing surface and the second longitudinally-facing surface face toward one another;
an annular sleeve configured to be positioned between respective radially-outer portions of the first longitudinally-facing surface and the second longitudinally-facing surface and to surround a portion of the first fastener when the first body and the second body are coupled to one another, wherein the annular sleeve comprises a ceramic material having a low thermal conductivity;
a second fastener configured to extend through another one of the plurality of first openings of the first flange and another one of the plurality of second openings of the second flange to couple the first body to the second body; and
an additional annular sleeve configured to be positioned between respective radially-outer portions of the first longitudinally-facing surface and the second longitudinally-facing surface and to surround a portion of the second fastener when the first body and the second body are coupled to one another; and
an annular seal element configured to be positioned between and to form an annular seal between respective radially-inner portions of the first longitudinally-facing surface and the second longitudinally-facing surface when the first body and the second body are coupled to one another.

2. The system of claim 1, wherein the annular sleeve comprises the ceramic material having the low thermal conductivity that is between 0 to 30 Watts per meter-Kelvin.

3. The system of claim 1, wherein the first body comprises a first annular recess and a second annular recess that form part of the respective radially outer portion of the first longitudinally-facing surface, the annular sleeve is supported within the first annular recess, and the additional annular sleeve is supported in the second annular recess.

4. The system of claim 3, wherein the first annular recess circumferentially surrounds the one of the plurality of first openings of the first flange, and the second annular recess circumferentially surrounds the another one of the plurality of first openings of the first flange.

5. The system of claim 1, wherein the annular sleeve comprises multiple segments coupled to one another.

6. The system of claim 5, wherein the multiple segments are coupled to one another via a key-slot interface.

7. The system of claim 1, wherein the annular sleeve comprises a rope that is wound about the first fastener.

8. The system of claim 7, wherein the first fastener comprises an annular recess and the rope is supported within the annular recess.

9. The system of claim 1, wherein the first body comprises a bonnet of a valve, and the second body comprises a valve body of the valve.

10. The system of claim 9, comprising an annular valve sleeve that is configured to circumferentially surround a neck of the bonnet of the valve.

11. The system of claim 1, wherein at least some respective parts of the respective radially-inner portions of the first longitudinally-facing surface and the second longitudinally-facing surface are configured to contact one another when the first body and the second body are coupled to one another.

12. A fluid-handling component, comprising:
a first body defining a first bore and comprising a first flange, wherein the first flange comprises a first longitudinally-facing surface and a plurality of first openings spaced apart from one another circumferentially about the first flange;
a second body defining a second bore and comprising a second flange, wherein the second flange comprises a second longitudinally-facing surface and a plurality of second openings spaced apart from one another circumferentially about the second flange;
a plurality of fasteners configured to extend through the plurality of first openings of the first flange and the plurality of second openings of the second flange to couple the first body to the second body such that the first bore is fluidly coupled to the second bore and such that the first longitudinally-facing surface and the second longitudinally-facing surface face toward one another;
a plurality of annular sleeves positioned between the first longitudinally-facing surface and the second longitudinally-facing surface, wherein each annular sleeve of the plurality of annular sleeves is configured to circumferentially surround a portion of a respective fastener of the plurality of fasteners and is comprised of a ceramic material having a low thermal conductivity to reduce heat transfer to the portion of the respective fastener of the multiple fasteners; and
a plurality of annular recesses of the first longitudinally-facing surface, wherein each of the plurality of annular recesses circumferentially surrounds a respective first opening of the plurality of first openings and is configured to receive one of the plurality of annular sleeves.

13. The fluid-handling component of claim 12, wherein each annular sleeve of the plurality of annular sleeves comprises the material having the low thermal conductivity that is between 0 to 30 Watts per meter-Kelvin.

14. The fluid-handling component of claim 12, comprising a plurality of additional annular recesses of the second longitudinally-facing surface, wherein each of the plurality of additional annular recesses circumferentially surrounds a respective second opening of the plurality of second openings and is configured to receive one of the plurality of annular sleeves.

15. The fluid-handling component of claim 12, wherein each annular sleeve of the plurality of annular sleeves comprises multiple segments coupled to one another.

16. The fluid-handling component of claim 12, wherein each annular sleeve of the plurality of annular sleeves comprises a rope that is wound about the respective fastener of the plurality of fasteners.

17. The fluid-handling component of claim 12, wherein the first body comprises a bonnet of a valve, and the second body comprises a valve body of the valve.

18. The fluid-handling component of claim 12, comprising an annular seal element configured to form an annular seal between respective radially-inner portions of the first longitudinally-facing surface and the second longitudinally-facing surface, wherein at least some respective parts of the respective radially-inner portions of the first longitudinally-facing surface and the second longitudinally-facing surface are configured to contact one another, and the respective radially-outer portions of the first longitudinally-facing surface and the second longitudinally-facing surface are configured to be separated from one another to form a longitudinally-extending gap, and the plurality of annular sleeves are positioned within the longitudinally-extending gap.

* * * * *